United States Patent Office
3,085,081
Patented Apr. 9, 1963

3,085,081
MOLECULAR ASSOCIATION COMPLEXES OF A UREA AND POLY(ETHYLENE OXIDE), AND MIXTURES THEREOF WITH POLY(ETHYLENE OXIDE)
Frederick E. Bailey, Jr., Charleston, W. Va., assignor to Union Carbide Corporation, a corporation of New York
No Drawing. Filed May 17, 1960, Ser. No. 29,597
5 Claims. (Cl. 260—42)

This invention relates to crystalline complexes of poly(ethylene oxide) and a urea. In a particular aspect, this invention relates to complexes of high molecular weight poly(ethylene oxide) and a urea which are resinous materials having utility in the production of molded and extruded articles and as modifiers for other resinous compositions.

The term "urea" as used herein is meant to include thiourea.

The novel molecular association resins provided by this invention comprise crystalline complexes of a urea and poly(ethylene oxide) having an average molecular weight in the range between about fifty thousand and ten million.

The term "association" or "complex" refers to the interaction which provides the binding force between the polymeric oxygen ether component and the urea component in the resin compositions. It is believed that the interaction involves one or more diverse mechanisms such as hydrogen bonding, secondary valence forces, and the like.

The formation of the crystalline complexes of the present invention is unexpected since a considerable molecular rearrangement is necessary for high molecular weight poly(ethylene oxide) to pass from an entangled coil structure in solution to the rigid configuration of the complex. Also unexpected is the advantageous combination of properties exhibited by these poly(ethylene oxide)-urea complexes as compared with the corresponding poly(ethylene oxide).

The poly(ethylene oxide) employed has a molecular weight between about fifty thousand and ten million, and preferably has a molecular weight in the range between one hundred thousand and seven million. In the absence of suitable molecular weight determination, useful poly(ethylene oxide) material is characterized as having an intrinsic viscosity in excess of 0.6 and not greater than 36 in water at a temperature of 30° C.

The crystalline complexes appear to form in a ratio of two moles of urea or thiourea to one mole of oxyethylene monomer unit. Theoretically, maximum complex formation ("pure" complex) is achieved when the composition contains approximately 75 percent by weight of urea, based on the weight of poly(ethylene oxide) and urea. The poly(ethylene oxide) complexes with urea or thiourea show distinct X-ray diffraction patterns, and the presence of a complex in a poly(ethylene oxide) matrix can be detected both by X-ray diffraction and by stiffness-temperature measurements.

An interesting aspect of the present invention is the incorporation of "pure" poly(ethylene oxide)-urea complex into poly(ethylene oxide) resin for the purpose of modifying the properties of the resin in an advantageous manner. The crystalline complex is employed in a quantity which produces the desired modification in the poly(ethylene oxide) resin. This modifying quantity of complex generally varies in the range between about 5 and 95 percent by weight, based on the weight of poly(ethylene oxide) resin. Alternatively, poly(ethylene oxide) resin can be modified by adding a modifying quantity of urea to the material and causing complex formation in the matrix.

Poly(ethylene oxide)-urea complex formation can be accomplished by several different methods. In one method of preparing the crystalline complexes, the urea or thiourea and poly(ethylene oxide) can be mixed on a hot roll mill. The mixture is fluxed at a mill temperature of about 150° C., and then milled at a temperature of about 100° C. Compositions containing up to about 50 percent by weight of urea or thiourea can be conveniently prepared in this manner. In another method, the poly(ethylene oxide) can be dissolved in a suitable solvent such as benzene, then finely-divided urea or thiourea is added as a suspension. The poly(ethylene oxide) is abstracted from the solution, and a quantitative yield of crystalline complex product is recovered as a precipitate. In another method, crystalline complex product can be formed by mixing a solution of poly(ethylene oxide) in a solvent such as benzene or toluene with a solution of urea or thiourea in a solvent such as methanol at a temperature around 0° C., and the complex is recovered as a precipitate. In the second method, i.e., dissolution of poly(ethylene oxide) in benzene with addition of urea in suspension, the formation of crystalline complex product proceeds more rapidly with thiourea than with urea.

The solutions of poly(ethylene oxide) employed in the solution methods of preparation of the complex products can vary in concentrations between about 0.1 and 5 percent by weight of poly(ethylene oxide). Formation of complex product in solution proceeds slowly, and a convenient rate can be achieved by employing a weight ratio of about 3 to 1 and higher of urea to poly(ethylene oxide).

The crystalline complex products of this invention have much higher melting points than the corresponding poly(ethylene oxide) material. For example, poly(ethylene oxide) having a melting point of 65° C. associates with urea (melting point 132° C.) to form a complex having a melting point of 143° C. The poly(ethylene oxide)-urea complexes in molded form are hard and rigid, and exhibit room temperature tensile strength which is equivalent to that of the corresponding molded poly(ethylene oxide).

The crystalline complexes can be molded, extruded or otherwise shaped into water-soluble articles. Such products make possible the formation of intricate passages in cast resin materials by casting the resin around the shaped water-soluble complex composition and subsequently dissolving away the complex composition.

A valuable aspect of the present invention is the provision of poly(ethylene oxide) resins modified with poly(ethylene oxide)-urea complex. The modified poly(ethylene oxide) compositions have improved strength characteristics which facilitate the removal of the compositions from calender rolls during sheeting operations. The modified poly(ethylene oxide) compositions are further characterized by improved solubility, e.g., in the conventional solvents for poly(ethylene oxide) such as water, and easier processability than the corresponding unmodified poly(ethylene oxide) resin.

The following examples will serve to illustrate specific embodiments of the invention.

*Example 1*

3 grams of poly(ethylene oxide) (molecular weight of approximately one million) was dissolved in 97 grams of benzene. This solution was added to a narrow-necked bottle and 5 grams of urea was added to the solution and the bottle was capped. The bottle was then rotated end-over-end for one hundred eighteen hours, after which time the contents of the bottle were removed and filtered. The filtered product was dried under vacuum at 25° C. and corresponded to a 5.2 gram yield of poly(ethylene oxide)-urea complex. From the benzene filtrate there was obtained 1.8 grams of poly(ethylene oxide) which had not entered into complex formation.

*Example 2*

In a manner similar to Example 1, 2.5 grams of urea was added to a solution of 0.5 gram of poly(ethylene oxide) (molecular weight of approximately one million) in 50 grams of benzene. The mixture was agitated for one hundred sixty hours and then filtered. After drying, the filtered material yielded 3 grams of poly(ethylene oxide)-urea complex.

*Example 3*

In a manner similar to the previous examples, 2.5 grams of thiourea was added to a solution of 0.5 gram of poly(ethylene oxide) (molecular weight of approximately one million) in 50 grams of benzene and then agitated for a period of ninety-seven hours at 25° C. 3 grams of poly(ethylene oxide)-thiourea complex was recovered by filtration and drying.

*Example 4*

A 100 gram mixture containing 90 percent by weight of poly(ethylene oxide) (molecular weight of approximately two million) and 10 percent urea was milled for about five minutes on a small two-roll mill. The temperature of the mill was raised to 150° C. and the mixture was fluxed and then taken off the mill. A sample of this material was checked under a birefrigence microscope and showed a melting point of 143° C. A portion of the material was molded at 100° C. under 1000 p.s.i.g. into a three-inch disk of about 10 to 20 mils thickness. A sample of the disk was tested and the following results were obtained from its stiffness-temperature curve:

| | ° C. |
|---|---|
| $T_2$ | 93 |
| $T_3$ | 65 |
| $T_4$ | 59 |
| $T_5$ | 5 |

*Example 5*

A poly(ethylene oxide)-urea complex was formed by adding 5 grams of urea to 100 milliliters of a benzene solution containing 1 gram of poly(ethylene oxide) (molecular weight of approximately one million) and then agitating the mixture for two hundred hours. A sample of the recovered product was molded for five minutes at 135° C. under 5000 p.s.i.g. to form a one-inch disk of about 20 mils thickness. A sample shaved from this disk had a melting point of 140° C. under a birefrigence microscope. An X-ray study of a sample shaved from the disk substantiated the presence of complex in the product.

What is claimed is:

1. A composition comprising a crystalline complex of a compound of the group consisting of urea and thiourea, and poly(ethylene oxide) having a molecular weight in the range between about fifty thousand and ten million.

2. The composition of claim 1 wherein said compound is thiourea.

3. Poly(ethylene oxide) resin having incorporated therein a modifying quantity of crystalline complex of a compound of the group consisting of urea and thiourea, and poly(ethylene oxide) having a molecular weight in the range between about fifty thousand and ten million.

4. The composition of claim 1 wherein said compound is urea.

5. The composition of claim 3 wherein said compound is urea.

References Cited in the file of this patent

UNITED STATES PATENTS

| 2,083,221 | De Groote | June 8, 1937 |
| 2,824,856 | Saunders | Feb. 25, 1958 |
| 2,828,291 | Saunders | Mar. 25, 1958 |
| 2,858,298 | Burt | Oct. 28, 1958 |
| 2,934,505 | Gurgiolo | Apr. 26, 1960 |
| 2,934,518 | Smith | Apr. 26, 1960 |
| 2,941,963 | Bailey et al. | June 21, 1960 |